(12) United States Patent  (10) Patent No.: US 6,765,681 B1
Sweetser et al.  (45) Date of Patent: Jul. 20, 2004

(54) MEASURING OPTICAL PHASE

(75) Inventors: John N. Sweetser, San Jose, CA (US); Anders Grunnet-Jepsen, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 141 days.

(21) Appl. No.: 10/119,501

(22) Filed: Apr. 10, 2002

Related U.S. Application Data

(60) Provisional application No. 60/282,961, filed on Apr. 10, 2001.

(51) Int. Cl.[7] ................................................. G01B 9/02
(52) U.S. Cl. ..................................... 356/515; 356/521
(58) Field of Search ............................... 356/515, 521, 356/520

(56) References Cited

U.S. PATENT DOCUMENTS 3,829,219 A * 8/1974 Wyant ........................ 356/515
4,707,137 A * 11/1987 Lee ............................. 356/520
5,237,388 A * 8/1993 Hirano et al. ............... 356/491
6,538,749 B1 * 3/2003 Takata et al. ............... 356/520

OTHER PUBLICATIONS

Applied Optics, Levi, chaper 2.4, 1968, pp 103–106.*

* cited by examiner

*Primary Examiner*—Samuel A. Turner
(74) *Attorney, Agent, or Firm*—Trop, Pruner & Hu, P.C.

(57) ABSTRACT

The phase (and amplitude) of a wave front may be accurately measured using knowledge of the wave front of an optical field generated by an optical element, permitting the determination of the spatial transfer function of that optical element. As a device under test is scanned across an aperture plate having slits, variations in the relative amplitude and phase of light passing through the slits are affected by the optical properties of the device under test, in turn affecting the interference pattern at a detector. Changes in the amplitude and phase of the detected signal are directly and uniquely related to the transfer function of the device under test.

33 Claims, 5 Drawing Sheets

MEASURING OPTICAL PHASE

CROSS-REFERENCE TO RELATED APPLICATIONS

This application is based on provisional patent application serial No. 60/282,961 filed Apr. 10, 2001.

BACKGROUND

Diffraction gratings and other diffractive optical devices have been developed for many applications. For example, so-called segmented diffraction gratings have been suggested for data routing in optical communication systems. Fiber Bragg gratings (FBGs) have been developed for applications including wavelength selection and routing in optical communications as well as numerous applications as optical sensors and in optical remote sensing.

Some methods of producing segmented diffraction gratings are based on holographic techniques, and FBGs have been made by exposing an optical fiber to an interference pattern produced with optical radiation at wavelengths that produce changes in the refractive index of a fiber. In one method, a mask is provided that is configured to provide a selected interference pattern. Ultraviolet radiation (at wavelengths that are typically between about 150 nm and 400 nm) is directed to the mask. A fiber in which an FBG is to be formed is placed in the interference pattern. The fiber is exposed to the interference pattern for a time period sufficient to produce index of refraction changes of a selected magnitude and in a spatial pattern corresponding to the interference pattern.

While methods for producing FBGs using masks can be simple to implement and have adequate manufacturing throughput, the properties of the resulting FBGs depend on the properties of mask used to produce the interference pattern. Such masks and other diffractive structures can be characterized with two beam interferometric methods in which an optical field produced by light transmitted through the mask is interfered with a reference plane wave. The resulting interference pattern is analyzed to provide phase information about the phase of the transmitted optical field. However, such methods have significant disadvantages. It is generally desirable to measure the transmitted phase front in the near field at distances from the diffractive structure that range from a few micrometers to a few millimeters. Configuring two beam interferometers for measurements at such near field distances is difficult. In addition, two beam interferometric methods generally require ultra-stable environments to eliminate phase noise due to mechanical vibrations or variations in refractive indices experienced by either an optical signal field (i.e., the optical field produced by the diffractive structure under test) or the reference optical field.

In view of these shortcomings, improved methods and apparatus are needed for the characterization of optical devices.

DETAILED DESCRIPTION

Methods and apparatus are provided for characterizing optical elements such as diffractive or refractive optical elements for estimation, measurement, or characterization of an optical transfer function. The optical transfer function pertains to amplitude and transverse phase contributions to an optical field produced by the optical element as a function of the angles at which an input optical field is directed to the optical element. In addition, the optical transfer function determines an angle or angles at which the output optical field propagates and is generally a function of position on the optical element and the angle of incidence of the input optical field. In a representative example, the methods and apparatus are configured for the characterization of the spatial dependence of the amplitude and phase (i.e., the optical transfer function) of transmissive or reflective diffraction gratings. It will be appreciated by those skilled in the art that the example methods and apparatus described herein can be modified in arrangement and detail for the characterization of a variety of optical elements including arbitrary diffractive, refractive, catadioptric or holographic optical elements. In addition, optical devices or systems consisting of multiple elements may also be characterized using a modified arrangement of the measuring system described herein. For example, an optical system consisting of two or more diffraction gratings may be characterized either by measuring the amplitude and phase of the entire multi-element system or by measuring the amplitudes and phases of its individual elements.

Embodiments of the present invention may be applied to optical wave front characterization in connection with a wide variety of optical devices. Any mechanism or device that affects the amplitude and/or phase of a wave front can be measured with embodiments of the present invention. Any material or device that modifies the wave front curvature of light that transmits through or reflects from it may be analyzed using embodiments of the present invention. Lenses and curved mirrors are two such devices. In general, any curved surface may be characterized by the present invention.

For convenience, the disclosed methods and apparatus are described with reference to characterization of representative optical structures such as planar diffraction gratings, specifically segmented diffraction gratings. An optical element 100 that may be a planar diffraction grating may include a series of periodic parallel grooves (not shown) in accordance with one embodiment of the present invention. The grooves are defined by a spatial orientation and a groove profile that can be configured to have a variety of shapes determined by a corresponding function or otherwise determined. For example, groove profiles can be sinusoidal, producing a periodic sinusoidal groove pattern. In other examples, the groove profiles are determined by a "top-hat" (square) function, resulting in a lamellar grating profile, or a saw-tooth function, resulting in a so-called "blazed grating."

The element 100 may be a transmission diffraction grating and can be defined by, for example, a periodic, linear arrangement of parallel grooves in one embodiment. An optical field, such as a uniform plane wave, that is incident to the element 100 is generally diffracted into one or more output directions.

Figure 1A:
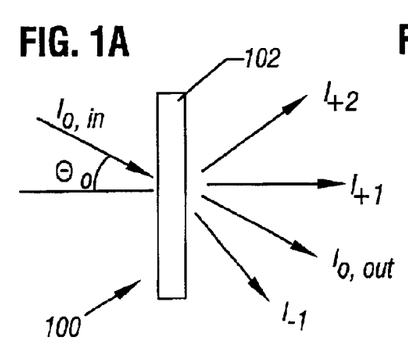
FIG. 1A is a schematic diagram illustrating diffraction of an input optical field by a grooved diffraction grating in accordance with one embodiment of the present invention.

As shown in FIG. 1A, an input optical field $I_{0,in}$ is diffracted into an output optical field that includes +2, +1, 0, −1 diffraction orders $I_{+2}$, $I_{+1}$, $I_{0,out}$, and $I_{-1}$, respectively. Other diffraction orders are generally produced but are not shown in FIG. 1A.

Figure 1B:
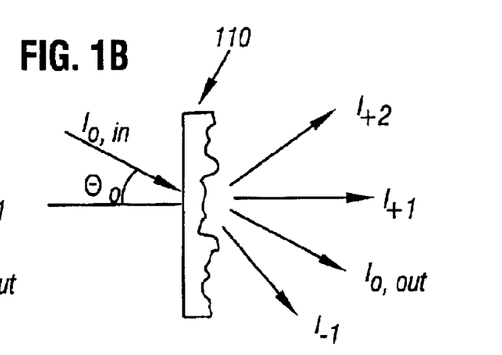
FIG. 1B is a schematic diagram illustrating diffraction of an input optical field by a diffractive structure that includes a transmissive optical material having a spatially varying optical thickness in accordance with one embodiment of the present invention.

The element 100 of FIG. 1A includes grooves defined by periodic spatial variations in optical transmittance, reflectance, or phase. FIG. 1B is a schematic of a transmissive grating 110 having a spatially varying thickness. The grating 110 can also include a spatially varying absorption or transmission. The grating 110 diffracts (and/or refracts) an input optical field $I_{0,in}$ into an output optical field that includes components $I_{+2}$, $I_{+1}$, $I_{0,out}$, and $I_{-1}$ corresponding to +2, +1, 0 and −1 diffraction orders, respectively. Components corresponding to additional orders are not shown in FIG. 1B.

Diffractive structures, according to some embodiments, can also include two-dimensional or three-dimensional variations in optical phase or optical transmittance. For example, combinations of two or more arbitrary functions can be used to define variations in substrate thickness, locations of grooves, or spatial variation of optical absorption or optical gain along orthogonal or non-parallel axes.

Figure 1C:
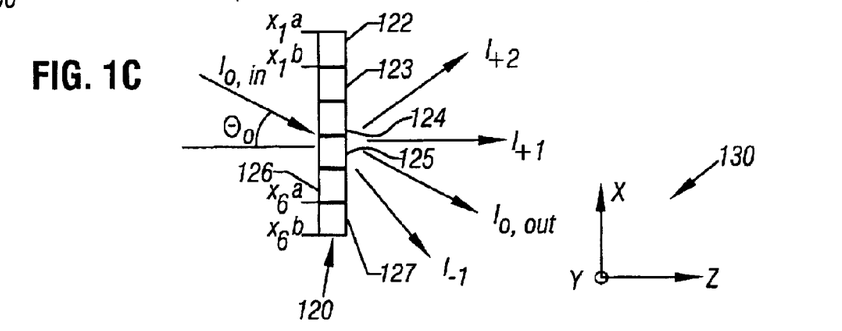
FIG. 1C is a schematic diagram illustrating diffraction of an input optical field by a segmented diffraction grating in accordance with one embodiment of the present invention.

The segmented diffraction grating 120, shown in FIG. 1C, illustrates a diffractive structure useful in one embodiment of the present invention. The grating 120 includes N=6 spatially distinct subgratings 122–127 arrayed contiguously to define the grating 120. In other examples, segmented gratings include subgratings 122–127 that are not contiguous. The subgratings 122–127 include periodic arrays of diffractive structures such as grooves, refractive index variations, or other features. The periodic arrays (and the grooves or other structures) are configured to provide, for example, a constant spatial period for the subgratings 122–127 such that the relative phases of the diffractive structures for each of the subgratings can be selected. In addition, relative subgrating amplitudes or amplitudes within one or more subgratings 122–127 can be selected. The optical thicknesses of the subgratings 122–127 can be controlled by, for example, variation of substrate thickness, addition of phase masks, or other methods to provide additional control over the optical transfer function. Variations of optical thickness within a selected subgrating 122–127 or between subgratings can be configured to control the relative phase of light directed from an input direction to an output direction. In one example, each of the subgratings has the same spatial period and grating profile, but with spatial phases such that there are discontinuities at segment boundaries.

In representative embodiments, an output optical field is produced by directing an incident optical field to an optical element at a selected angle. The incident optical field can be a uniform plane wave, a spherical wave, or other characterized or characterizable reference radiation pattern. The output optical field of the element (i.e., in the near field) exhibits spatial variations in amplitude and phase that are determined by the optical properties of the element and the incident optical field. By measuring the spatial variation in amplitude and phase in the near field, a near-field transmission or reflection function of the element can be obtained, and parameters corresponding to amplitude and phase can be determined.

An amplitude component of the transfer function (or "transmission function" for a transmissive optical element) can be measured using conventional techniques including, for example, by placing a pinhole near the grating and then translating either the grating or the pinhole (or both) in a plane transverse to the propagation direction of the incident optical field. With reference to FIGS. 1A–1C, such translation includes movement in an xy-plane defined by a coordinate system 130. By translating or scanning the pinhole, the transfer function amplitude is measured in a selected output direction that can be determined by placement of a photodetector, such as, for example, a photodiode, diode array, or charge-coupled device (CCD). In addition, a lens, mirror, or other optical element can be situated to increase the efficiency with which diffracted radiation is collected and directed to the photodetector.

Figure 2A:
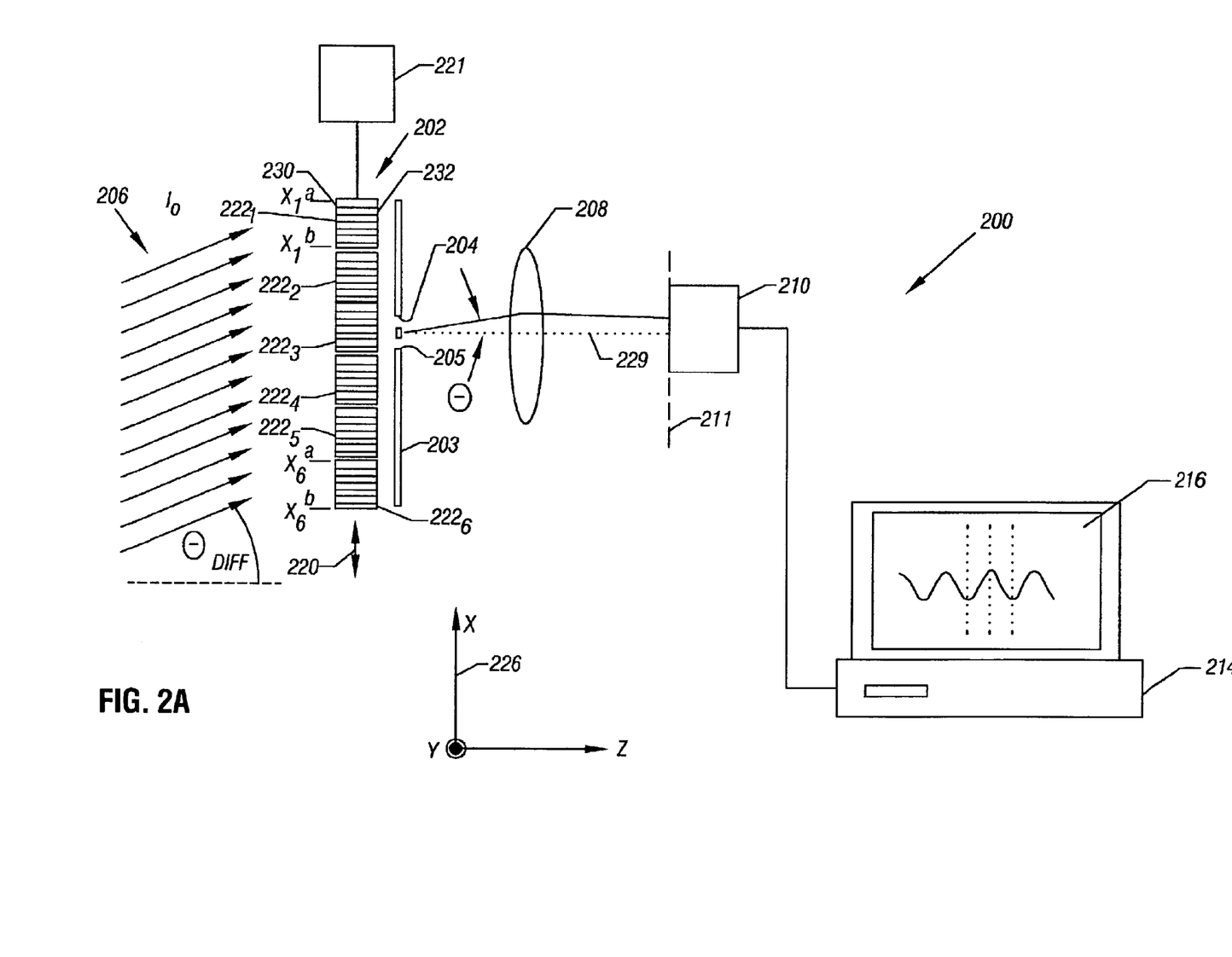
FIG. 2A is a schematic block diagram of an apparatus configured for measurement of amplitude and phase contributions to an output optical field produced by directing an input optical field to a segmented diffraction grating, wherein the output optical field propagates along an axis that is approximately perpendicular to the grating in accordance with one embodiment of the present invention.

With reference to FIG. 2A, an apparatus 200 configured for characterizing or measuring spatially dependent amplitude and phase contributions to an optical field incident to an optical element 202, such as a segmented grating, includes an aperture plate 203 that defines slits 204, 205. In one embodiment, a well collimated optical source 206, such as a laser beam from a 1 mW frequency stabilized He—Ne laser (not shown) at a wavelength $\lambda$=633 nm, is expanded, collimated, and directed incident to normal to the element 202. A lens 208 is situated to receive optical radiation from slits 204, 205 and direct the radiation to a detector array 210 placed at a focal plane 211 of the lens 208. In an example, the slits 204, 205 are situated approximately 5 mm behind the element 202 and the lens 208 is a plano-convex lens having a 1 m focal length. The lens 208 is situated to direct a first order diffracted beam to the detector array 210. In a particular embodiment, the detector array 210 is a HAMAMATSU S3903-256Q diode array that includes 256 detector elements having a pixel size of 25 $\mu$m by 500 $\mu$m. The diode array is controlled using a HAMAMATSU 4070 driver amplifier board.

An electronic signal corresponding to the radiation distribution at the detector array 210 is communicated to a data processor 214 that is configured to store and analyze radiation distribution data. A display unit 215 may also be used. In a particular embodiment, the data processor 214 includes a National Instruments AT-MIO-16XE10 data acquisition board and a computer. In one embodiment, data acquisition, analysis, and data manipulation are performed with NATIONAL INSTRUMENTS LABVIEW software using a LABVIEW program that may be configured to determine the period and amplitude of the sinusoidal intensity pattern and the relative phase shifts of the pattern acquired by grating translation. The program and/or data can be stored on a hard disk or provided on a floppy disk or CD-ROM or other computer readable media.

The laser beam 206 (approximately a plane wave optical field) of intensity $I_0$ is directed to the element 202. The element 202 is situated on a translation stage 221 and translated with respect to the slits 204, 205 along an axis 220 in one embodiment. The element 202 may include 6 contiguous segments $222_i$, for i=1, . . . 6 spanning respective intervals $x_i^b - x_i^a$ in one embodiment. The structure of the element 202 may be periodic along an x-axis 226.

The slits 204, 205 may be situated near a front surface 230 or a back surface 232 of the element 202. The optical field produced by the slits 204, 205 and the element 202 is recorded as a far-field intensity pattern at the detector array 210 while the segmented grating 202 is translated relative to the slits 204, 205. The analysis of the radiation pattern received by the detector array 210 is discussed below with reference to the slits 204, 205 but it will be apparent that apertures of other shapes and configurations can be used and the analysis of such arrangements is similar to the following two slit analysis.

As shown in FIG. 2A, the incident beam 206 of intensity $I_0$ is incident at an angle $\theta_{diff}$ to the element 202 so that a portion of the beam 206 that propagates through the element 202 and the slits 204, 205 is approximately perpendicular to the element 202 in one embodiment. For example, the angle $\theta_{diff}$ can correspond to a diffraction angle of an $n^{th}$ diffraction order in a diffractive example. The lens 208 and detector array 210 are configured to receive portions of the incident beam that are diffracted at an angle $\theta$ with respect to an axis 229. As shown in FIG. 2A, the beam 206 is directed to the element 202 at an angle associated with a diffraction order of the element 202, in a diffractive embodiment, so that an appreciable portion of the beam 202 exits the element 202 perpendicularly. The incident beam 206 may be configured so that, in the absence of the aperture plate 203, a diffraction order of the element 202 propagates an angle $\theta$ of about $\theta=0$ in one embodiment.

Figure 2B:
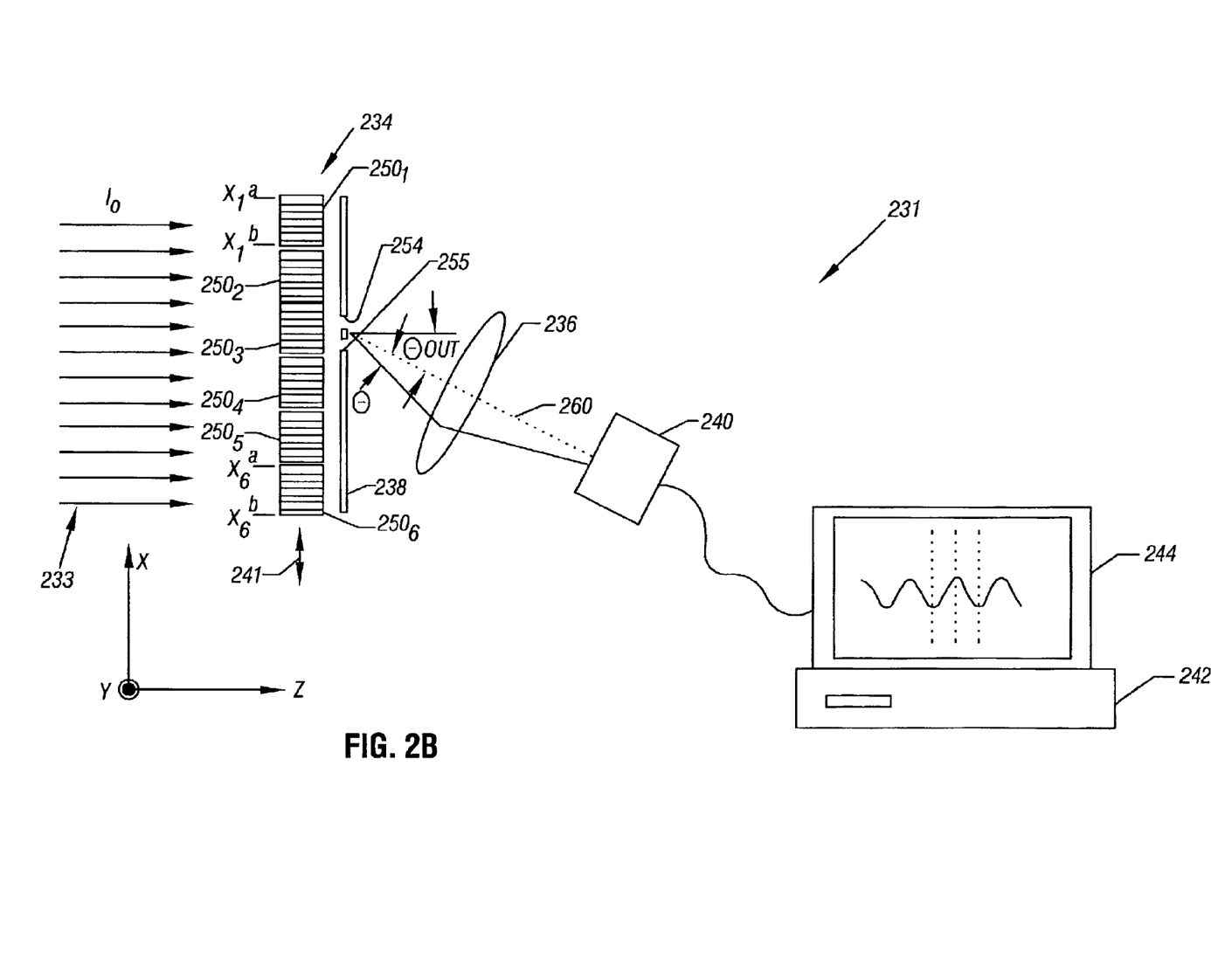
FIG. 2B is a schematic block diagram of an apparatus in accordance with one embodiment of the present invention, configured for measurement of amplitude and phase contributions to an output optical field produced by directing an input optical field perpendicularly to a segmented diffraction grating.

While the arrangement of FIG. 2A is convenient, other arrangements are also suitable. FIG. 2B shows a schematic diagram of a measurement system 231 that is configured so that an incident beam 233 of intensity $I_0$ is perpendicularly incident to an optical element 234 that includes segments $250_1$, . . . , $250_6$ and produces and output beam that propagates along an axis 260 at an angle $\theta_{out}$ with respect to the element 234, wherein $\theta_{out}$ may correspond to a diffraction angle of a diffraction order of the element 234 in a segmented diffraction grating embodiment. Portions of the beam 233 are transmitted through apertures 254, 255 in an aperture plate 238 and are directed by a lens 236 to an array detector 240 that is situated at a focal plane of the lens 236. The array detector 240 is in communication with a processor 242 (such as a personal computer) that is provided with a display 244 configured to display data based on data received from the array detector 240. The configuration of FIG. 2B is similar to that of FIG. 2A, but the system 231 is arranged with the incident beam 233 perpendicular to the element 234 and a diffracted beam parallel to a direction of an output diffraction order. The element 234 is translated with respect to he slits 254, 255 along an axis 241.

In the arrangements of FIGS. 2A–2B, the intensity pattern is used to calculate the spatial variation of the diffraction efficiency and phase through calculations based on the amplitude, phase, and periodicity of the intensity pattern as described below. The relative phase shifts may be summed sequentially and plotted versus grating translation distance to provide a map of the optical phase of the diffracted light, and corresponding phases of the grating segments in some embodiments. More complex mathematical treatment of the data may also be performed after acquisition.

Figure 3:
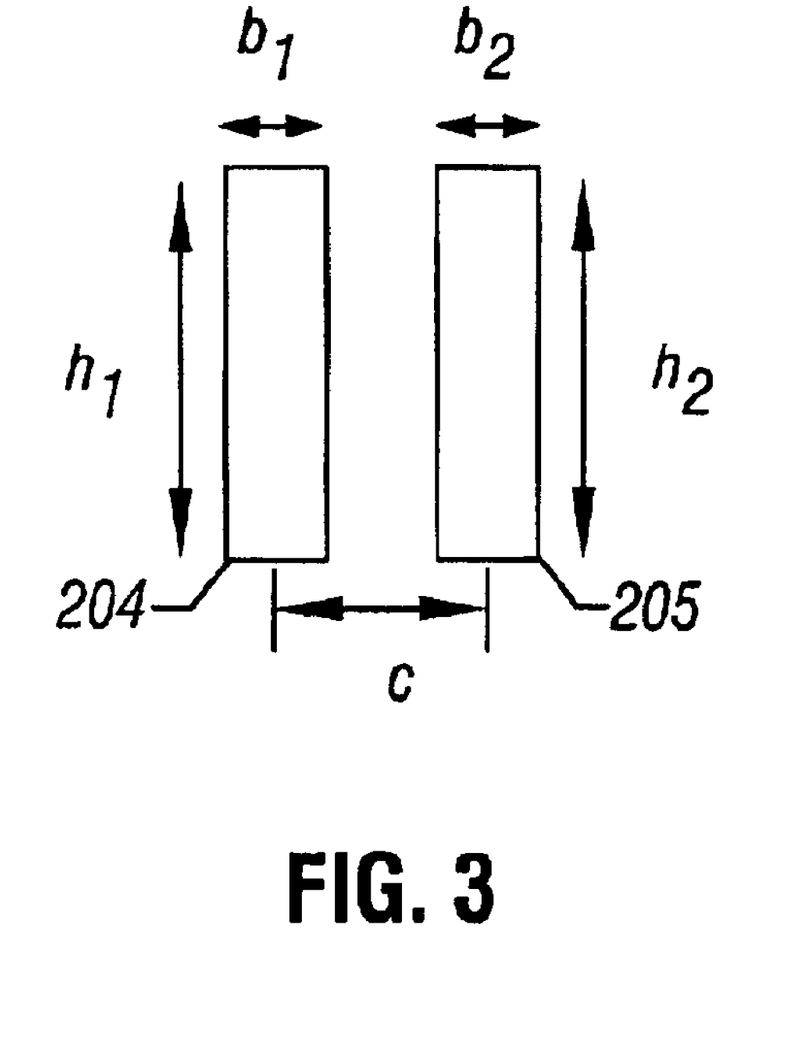
FIG. 3 is a schematic diagram of a pair of slits in accordance with one embodiment of the present invention.

With reference to FIG. 3, the slits 204, 205 have widths $b_1$, $b_2$ and lengths $h_1$, $h_2$, respectively, and are separated by a distance c. The far-field intensity pattern produced by irradiating the slits 204, 205 is a sinusoidal function with an envelope determined by the widths of the slits and a period determined by the spacing between the slits. Assuming that the slits 204, 205 are very long ($h_1$, $h_2$ are large), then the intensity pattern in the far field corresponds to:

$$I(k) = I_0 \frac{\sin^2(kb/2)}{(kb/2)^2}[1 + m \cos(kc + \Delta\phi_{12})], \quad (1)$$

for b=b1=b2 and a slit separation c, wherein $I_0 = I_1 + I_2$ is a total intensity, I1 and I2 are intensities transmitted through slits 204 and 205, respectively, $k = (2\pi/\lambda)\sin\theta$, $\theta$ is the output angle shown in FIG. 2A and 2B, $\lambda$ is a center wavelength of the incident optical field, m is a modulation index, and $\Delta\phi_{12}$ is a measured difference in phase between radiation transmitted through slits 204, 205. If the system 230 is configured to use an nth diffraction order, the measured phase $\alpha\phi_{12}$ is proportional to a product of the diffraction order n and a phase difference $\Delta\phi_G$, wherein $\Delta\phi_G$ is a phase difference on the grating 202. Placing the photodetector array 210 at the focal plane 211 of the lens 208 produces a radiation pattern at the detector array 210 that corresponds to the far field diffraction pattern produced by the slits 204, 205. The far field radiation pattern corresponds to the Fourier transform of the radiation pattern at the slits 204, 205.

The modulation depth m of the intensity pattern at the detector array 210 depends on a ratio of the intensities of the light transmitted through the slits 204, 205, and typically $m = 2(I_1/I_2)^{1/2}(1+I_1/I_2)$. The total intensity $I_0$ is proportional to the total light transmitted through both slits. Measurement of m and $I_0$ permits estimation of relative diffraction efficiency. The phase of the sinusoidal intensity pattern is related to phase differences between the light transmitted through the slits 204, 205. Phase and amplitude contributions to the transmitted optical field by the optical element (or other irradiated structure) determine the optical radiation pattern at the detector array 210. By scanning the element 202 relative to the slits 204, 205 and recording the detected radiation pattern, phase differences between radiation at the slit 204 and the slit 205 can be obtained as a function of the position of the slits with respect to the element 202. Estimation or calculation of the phase transmission function can be accomplished using Equation (1) above. The slit spacing c and slit width $b_1$, $b_2$ can be selected to have convenient values, and are generally selected based on dimensions of the detector array, the focal length of the lens 212, or spatial resolution to be produced by the measurement.

The apparatus 200 provides amplitude or phase measurements (or both) based on interference of radiation from the slits 204, 205. The apparatus 200 may not require special vibration isolation or precise control of other environmental variables, in some embodiments, when the interfering optical fields originate at the same structure (i.e., the optical element 202), and, for example, lateral or transverse vibrations of the structure tend to produce similar variations in the fields from each slit propagate through a similar environment so that, for example, air turbulence does not significantly contribute to phase differences between the interfering beams in some embodiments. Because the interference pattern at the detector array 210 may be relatively insensitive to mechanical and environmental instabilities in some cases, detection of the interference pattern can be accomplished over a long time period without accumulation of additional phase or amplitude noise. In addition, the apparatus 200 may be convenient because a separate reference radiation field need not be provided.

Figure 4A:
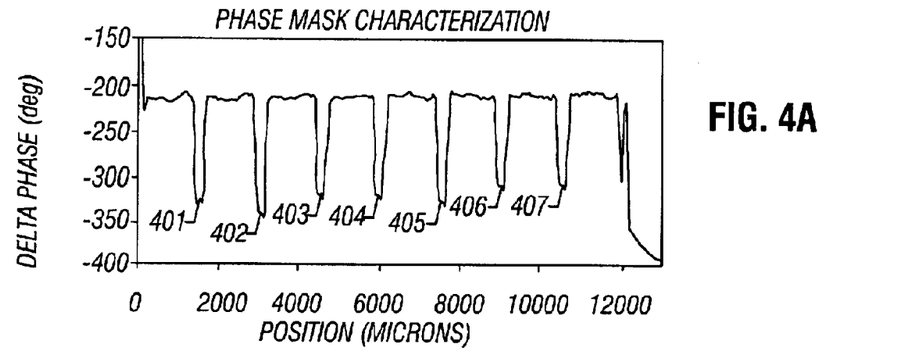
FIG. 4A is a graph of phase difference as a function of position for a segmented transmission grating have eight segments based on data obtained using the apparatus of FIG. 2A.
Figure 4B:
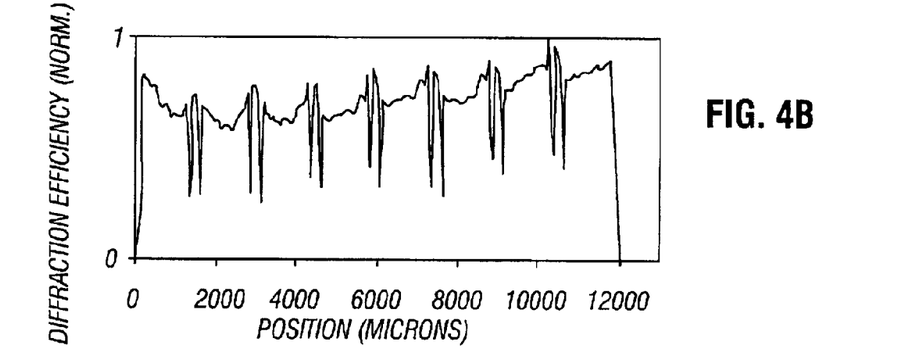
FIG. 4B is a graph of diffraction efficiency as a function of position for a segmented transmission grating have eight segments based on data obtained using the apparatus of FIG. 2A.
Figure 4C:
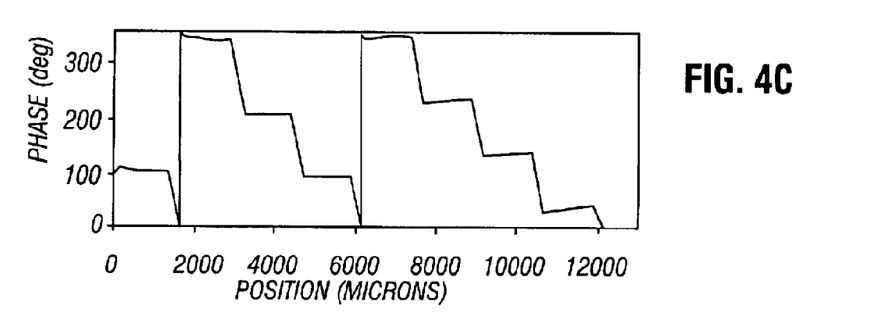
FIG. 4C is a graph of phase as a function of position for a segmented transmission grating having eight segments based on data obtained using the apparatus of FIG. 2A.

FIGS. 4A–4C are graphs of relative phase, diffraction efficiency, and reconstructed phase, respectively, as functions of position for segmented diffraction grating have 8 contiguous subgratings with phase shifts between adjacent subgrating. Each subgrating has a groove period of about 3 $\mu$m and a width of about 1.5 mm. Total grating length is about 12 mm. The apparatus 200 of FIG. 2A is used to acquire phase and amplitude data using slits 204, 205 that are separated by about 0.5 mm and having widths of about 50 $\mu$m. The data used to produce the graphs of FIGS. 4A–4C was obtained by scanning the grating with the slits fixed. As shown in FIG. 4A, the relative phase shifts between the various subgratings are apparent as phase excursions 401–407, each having an approximate magnitude of 120 degrees. The graph of FIG. 4C illustrates phase relative to a reference phase of 0 degrees at an initial position (0 $\mu$m) at an end of the grating. The grating that was measured to obtain the data used to produce the graphs of FIGS. 4A–4C was designed to have phase shifts of 120 degrees between adjacent segments, and FIGS. 4A–4C indicate the presence of such phase shifts. From the relative phase data (FIG. 4A), it is possible to obtain additional information about the grating. For diffraction gratings in particular the grating chirp (or grating period variation) is an important parameter. The grating chirp is simply related to the measured relative phase by a scale factor that depends on the grating period and the slit separation. Once the scale factor is determined for a particular setup and grating, then the chirp across the grating can be obtained directly from the relative phase data.

The accuracy and resolution of the methods and apparatus described herein may depend on several factors, in some embodiments, including laser noise (or noise in other incident optical field), noise in the detector array, as well as parameters such as slit width and slit separation. Generally, there is a tradeoff between spatial resolution and phase accuracy—a smaller slit separation provides better spatial resolution at the expense of phase accuracy. A larger slit spacing provides better phase accuracy at the expense of spatial resolution. Choice of slit width and slit separation depends on intended spatial resolution and phase accuracy as well as the optical imaging and detection system such as the lens 208 and the detector array 210. The resolution of a phase measurement can be increased, without chancing the slit widths, by recording relative phases across the grating at spatial intervals equal to the slit width and concatenating these measured phase differences. In this way, information about phase variations between the slits can be obtained. However, due to the lack of measured data over the portion of the grating where the scan begins—a distance equal to the slit separation—there is some uncertainty in the spatial phase that will cause an offset error in the reconstructed phase profile. The magnitude of the error depends on the actual phase profile over the region of uncertainty. If the measured phase profile is reasonably smooth, then the measured phase data can be extrapolated into this region with only a small loss in accuracy. In addition, if there is some knowledge (obtained by some other method) about the phase and/or amplitude profile of the grating over any region or regions equal in length to approximately the slit separation, then the method described above can be used to reconstruct the phase and/or amplitude over the entire length of the grating.

Accuracy of phase measurements obtained with the apparatus 200, 230 of FIGS. 2A–2B can be dependent on the linearity of the translations along the axes 220, 241, respectively. For example, with reference to the apparatus 200, angular motion of the translation stage 221 produced during translation along the axis 220 produces changes in angles of incidence and diffraction. Such changes typically produce angular deviations of the diffraction pattern produced by the slits 204, 205. This angular deviation can produce an apparent phase shift between the slits 204, 205 that does not correspond to phase shifts produced by the element 202. If determinations of phase shifts do not compensate or correct for the effects of angular deviations produced by the translation stage 221, then the measured phase shifts will include these apparent phase shifts.

In some applications, removal of the apparent phase shifts may be advantageous. One method of minimizing or reducing the effect of stage errors is to independently measure phase shifts produced by stage errors to obtain a phase correction that can be used in conjunction with Equation 1. In another method of compensating for stage errors, the apparatus 200 (or 230) can be configured to reduce contributions to phase measurements produced by stage errors. For example, the input beam 206 can be configured so that $\sin(\theta_{in}) = \sin(\theta_{out}) = (n\lambda)/2\Lambda$, where $\theta_{in}$ and $\theta_{out}$ are input and output diffraction angles, respectively, measured with respect to the grating normal, n is the diffraction order, $\lambda$ is the wavelength of the input light, and $\Lambda$ is the grating period. This configuration, which is known in the art as the minimum deviation angle, exhibits reduced deviation of the angle of the diffracted beam with respect to the slits for small angular deviations of the input beam with respect to the grating. In a particular example, with $\lambda=633$ nm, $\Lambda=3$ $\mu$m, $|n|=1$, then $\theta_{in}=-\theta_{out}=\pm6.06$ degrees for n=1. In this configuration, an angular deviation of about 1 degree changes the output angle by less than 0.0002 degrees. In comparison, a 1 degree deviation of the grating with normal incidence ($\theta_{in}=0$ degrees) of the input beam (FIG. 2B) produces an angular deviation of about 0.025 degrees from the diffracted beam.

For measurements with the apparatus 230 of FIG. 2B, the analysis can be modified to include effects caused by the non-orthogonality of the aperture plate 238 and the axis 260. Such modifications can include using projections of slit widths and slit spacing onto a plane perpendicular to the axis 260. If apertures or set of apertures other than two slits are used, then similar diffraction calculations can be performed based on such apertures. In addition, the phase term $\Delta\phi_{12}$ can include contributions based on a selected diffraction order. For example, aligning the input beam 206 of FIG. 2A such that $\theta_{diff}$ corresponds to an nth diffraction order can produce a corresponding contribution to $\Delta\phi_{12}$.

The optical phase and amplitude characterization methods and apparatus have been described above with reference to transmission diffraction gratings. However, these methods and apparatus are readily modified for other optical elements including reflective diffractive structures. For reflective structures, the input optical field is incident on the same side of the grating as the output optical field. This presents some constraints on placement of the slits with respect to the grating surface, especially for small diffraction angles. However, it is relatively straightforward to modify the apparatus of FIG. 2A–2B for amplitude and phase measurements of reflective gratings. For example, using an optical spot size (e.g., a laser beam width) that is only slightly larger than the slit separation and placing the slits a distance from the grating such that the incident light is not blocked by the slits, permits such measurements. The minimum slit-grading distance d depends on the slit separation c, the slit width b, and the diffraction angle, $\theta$, wherein $d > (c+2b)/\tan \theta$. For typical configurations, the minimum d is approximately 2–5 mm. By performing measurements using a second (or a higher) diffraction order, the diffraction angle increases and slits can be placed even closer to the grating. In the case where it is desirable to minimize the effect of stage errors in the characterization of reflective gratings, it is possible to use a minimum deviation configuration similar to that described for transmission gratings. This configuration, known in the art for reflection gratings as the Littrow condition, results in reduced sensitivity in the phase measurement to stage errors. In the Littrow configuration, the reflected beam counter propagates with the incident beam and thus must be separated using a beam splitter or equivalent device. This places an additional constraint on the proximity of the slits to the grating but should not cause a significant reduction in the accuracy of the measurement. Other than these modifications, the procedures and analyses for the amplitude and phase characterization of reflective gratings are generally similar to transmission gratings.

Optical elements may have transfer functions with phase and amplitude contributions from multiple independent sources. One may quantitatively and unambiguously determine each of the contributions by modifying and extending the methods described above. For example, a diffraction grating written into a substrate with curved surfaces has contributions to the transfer function phase from the grating itself and from the substrate curvature. By performing two measurements on the grating, both components can be determined. One scan may be followed by another after the grating is rotated 180° about an axis normal to its surface. The grating phase and the substrate phase contribute in different ways to the measured phase for these two scans in such a way that their effects may be separated by processing the data obtained from the two scans. In general, depending on the nature of the various mechanisms leading to wave front distortion, it will be possible in many cases to use embodiments of the present invention to isolate multiple contributions from the wave front or device transfer function.

In the embodiment illustrated in connection with FIG. 2, the detected fringe pattern is effectively integrated along the length of the slits or perpendicular to the scanning X direction. Spatial information may also be obtained in the Y direction. By imaging the slits in the Y direction onto a two dimensional detector array, the two dimensional spatial transfer function of the device under test or wave front may be measured.

Because this phase measurement is sensitive to the relative optical phase of the light between the two slits, any mechanism that affects the relative phase may be detected in some embodiments. One such mechanism is angular change in predominantly linear motion. For example, if a flat or well characterized mirror is placed on a translation stage that moves in a perpendicular direction to the mirror surface normal and the reflected optical field passes through the slits, then slight deviation from linear translation called stage yaw can be measured as described above. Alternatively, a mirror can be positioned so that the stage moves parallel to both the mirror surface normal and the beam propagation direction. This arrangement has the advantage that the mirror does not have to be optically flat or characterized since the beam position on the mirror does not change during the scan. However, since the incident beam retro reflects from the mirror, the incident and reflected beams must be separated with a beam splitter in a manner similar to the measurement of reflective gratings. For this arrangement, the angular error in the motion is related to the measured phase shift as follows: $\tan(\phi) = (\lambda/2d)(\Delta\phi_{12}/360)$, where $\phi$ is the stage error, $\lambda$ is the measuring light wavelength, d is the slit separation, and $\Delta\phi_{12}$ is the measured phase shift. For the examples described above (He—Ne laser and slit separation of 250 microns), the measurement provides less than 1 arc second of angular error detection for every degree of measured phase shift. For other incident angles, the relationship between $\phi$ and $\Delta\phi_{12}$ is slightly modified. Other arrangements of mirrors and slits can be used to measure angular motion in other directions such as pitch and roll. Also, a two dimensional arrangement using crossed slit pairs and two dimensional detectors may be used to measure different angular motion simultaneously.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   exposing at least one optical element to a light;
   causing said light to pass through a pair of slits after exposing said optical element;
   displacing said optical element relative to said slits;
   diffracting light with said optical element;
   producing an interference pattern; and
   measuring the phase of said light using said pattern.

2. The method of claim 1 including measuring the amplitude of said light.

3. The method of claim 2 including determining the transfer function of said element.

4. The method of claim 3 including determining the contribution of each of a plurality of independent sources to said transfer function.

5. The method of claim 1 including causing light to reflect from said optical element.

6. The method of claim 1 including causing light to be transmitted through said optical element.

7. The method of claim 1 including diffracting light with said optical element.

8. The method of claim 7 including measuring the transfer function of a diffractive grating.

9. The method of claim 1 wherein exposing at least one optical element to a light includes exposing said element to a collimated light source.

10. The method of claim 1 including translating said element relative to said slits in a direction parallel to the axis along which said element is to be measured.

11. The method of claim 1 including exposing a curved optical element.

12. The method of claim 1 including imaging said slits along their length.

13. The method of claim 1 including detecting changes in amplitude or phase of a far field diffraction pattern produced by said slits.

14. The method of claim 1 including moving an optical element having a reflective surface and detecting the deviation from a linear translation of said movement.

15. An apparatus comprising:
   a stage to move at least one optical element under test, said stage to translate the optical element;
   an aperture plate having two slits extending thereon; and
   a light source to expose said optical element under test.

16. The apparatus of claim 15 wherein said plate includes apertures having a length and a width and said stage moves the optical element in the width direction of said slits.

17. The apparatus of claim 15 including an optical system to receive said light after interacting with said device under test, said optical system including one or more lenses and a detection array.

18. The apparatus of claim 17 including a processor-based system to receive an input from said detection array and to determine a transfer function of said optical element under test.

19. The apparatus of claim 15 wherein said light source is a collimated light source.

20. A method comprising:

exposing at least one optical element to a light source;

providing a pair of slits in a plate;

causing light from said element to pass through said slits;

detecting the far field diffraction pattern produced by said slits; and detecting deviation from linear translations.

21. The method of claim 20 including detecting changes in amplitude or phase of said far field diffraction pattern.

22. The method of claim 21 including determining the transfer function of the element using the amplitude and phase of the detected signals.

23. The method of claim 20 including measuring the curvature of a curved surface of said element.

24. The method of claim 20 including causing light to reflect from the optical element.

25. The method of claim 20 including causing light to be transmitted through said optical element.

26. The method of claim 20 including diffracting light from said optical element.

27. The method of claim 20 including using the minimum deviation angle configuration.

28. The method of claim 20 including determining the grating period variation.

29. A method comprising:

exposing at least one optical element to a light;

causing said light to pass through a pair of slits after exposing said optical element;

displacing said optical element relative to said slits by translating said element relative to said slits in a direction parallel to the axis along which said element is to be measured;

producing an interference pattern; and measuring the phase of said light using said pattern.

30. The method of claim 29 including measuring the amplitude of said light.

31. The method of claim 30 including determining the transfer function of said element.

32. The method of claim 31 including determining the contribution of each of a plurality of independent sources to said transfer function.

33. The method of claim 29 including diffracting light with said optical element.

* * * * *